United States Patent
Tokumoto

(10) Patent No.: US 10,552,718 B2
(45) Date of Patent: Feb. 4, 2020

(54) MOBILE TERMINAL CAPABLE OF WIRELESS COMMUNICATION AND INCLUDING A LOCK SCREEN, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Hirokazu Tokumoto, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/984,603

(22) Filed: May 21, 2018

(65) Prior Publication Data

US 2018/0341841 A1 Nov. 29, 2018

(30) Foreign Application Priority Data

May 23, 2017 (JP) .................................. 2017-101801

(51) Int. Cl.
*G06K 15/00* (2006.01)
*H04W 12/06* (2009.01)

(52) U.S. Cl.
CPC ........ *G06K 15/4095* (2013.01); *H04W 12/06* (2013.01)

(58) Field of Classification Search
None
See application file for complete search history.

(56) References Cited

U.S. PATENT DOCUMENTS

| 9,535,634 B2 | 1/2017 | Takahira |
| 2015/0381798 A1* | 12/2015 | Yoon ................. H04M 1/72577 455/411 |
| 2016/0156775 A1* | 6/2016 | Waisel ............. H04M 1/72577 455/411 |
| 2016/0337851 A1* | 11/2016 | Yokoyama ............ H04W 12/06 |
| 2017/0127278 A1* | 5/2017 | Yamamoto ............ H04W 12/06 |

FOREIGN PATENT DOCUMENTS

| CN | 102279710 A | 12/2011 |
| CN | 103577594 A | 2/2014 |
| CN | 105611045 A | 5/2016 |
| CN | 106534452 A | 3/2017 |

OTHER PUBLICATIONS

Office Action issued in Chinese Appln. No. 201810471258.8 dated Nov. 6, 2019. English translation provided.

* cited by examiner

*Primary Examiner* — Andrew H Lam
(74) *Attorney, Agent, or Firm* — Rossi, Kimms & McDowell LLP

(57) ABSTRACT

A mobile terminal that is capable of reducing time and effort of a user when the user gives an execution instruction to an image processing apparatus. A memory device stores a set of instructions. At least one processor executes the set of instructions to detect an image processing apparatus that performs wireless communication, display, on a display unit, a lock screen that accepts an unlocking operation by a user, display, on the display unit, a screen of a control application for controlling an image processing apparatus, after the unlocking operation is accepted, accept, while displaying the lock screen, an execution instruction for controlling the detected image processing apparatus, without accepting the unlocking operation by a user.

8 Claims, 7 Drawing Sheets

MOBILE TERMINAL CAPABLE OF WIRELESS COMMUNICATION AND INCLUDING A LOCK SCREEN, CONTROL METHOD THEREFOR, AND STORAGE MEDIUM STORING CONTROL PROGRAM THEREFOR

BACKGROUND OF THE INVENTION

Field of the Invention

The present invention relates to a mobile terminal that is capable of wireless communication, a control method therefor, and a storage medium storing a control program therefor.

Description of the Related Art

There is a known mobile terminal that remotely operates an MFP (Multi-Function Peripheral). The mobile terminal displays a remote operation screen for a remote operation of the MFP, and accepts instructions for controlling the MFP to execute various processes according to user's operations on the remote operation screen. The user operates the remote operation screen to give a login instruction for logging in to the MFP and a print instruction for controlling the MFP to print. When accepting the print instruction, the mobile terminal detects an MFP that will be a communication destination (hereinafter referred to as a "communication destination MFP") and sends user information for logging in to the detected communication destination MFP to the communication destination MFP by short-range wireless communication, for example. The communication destination MFP performs a login process on the basis of the obtained user information and prints print data associated with the above-mentioned user information (for example, see U.S. Pat. No. 9,535,634).

Incidentally, when the mobile terminal satisfies a predetermined condition set up beforehand, the mobile terminal switches a displayed screen from the remote operation screen to a lock screen that restricts user's input operations. The user cannot give an execution instruction to the communication destination MFP by only operating the lock screen. When the lock screen is unlocked and the display of the mobile terminal switches from the lock screen to the remote operation screen, the user is allowed to give an execution instruction via the remote operation screen.

However, the conventional mobile terminal requires a user to perform a predetermined unlocking operation for unlocking the lock screen when the user wants to give an execution instruction to the communication destination MFP under a condition where the lock screen is displayed, which causes time and effort.

SUMMARY OF THE INVENTION

The present invention provides a mobile terminal, a control method therefor, and a storage medium storing a control program therefor, which are capable of reducing time and effort of a user when the user gives an execution instruction to an image processing apparatus.

Accordingly, a first aspect of the present invention provides A mobile terminal including a memory device that stores a set of instructions, and at least one processor that executes the set of instructions to detect an image processing apparatus that performs wireless communication, display, on a display unit, a lock screen that accepts an unlocking operation by a user, display, on the display unit, a screen of a control application for controlling an image processing apparatus, after the unlocking operation is accepted, accept, while displaying the lock screen, an execution instruction for controlling the detected image processing apparatus, without accepting the unlocking operation by a user.

Accordingly, a second aspect of the present invention provides a control method for a mobile terminal, the control method including detecting an image processing apparatus that performs wireless communication, displaying, on a display unit, a lock screen that accepts an unlocking operation by a user, displaying, on the display unit, a screen of a control application for controlling an image processing apparatus, after the unlocking operation is accepted; and accepting, while displaying the lock screen, an execution instruction for controlling the detected image processing apparatus, without accepting the unlocking operation by a user.

Accordingly, a third aspect of the present invention provides a non-transitory computer-readable storage medium storing a control program causing a computer to execute the control method of the second aspect.

According to the present invention, time and effort of a user when the user gives an execution instruction to an image processing apparatus is reducible.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
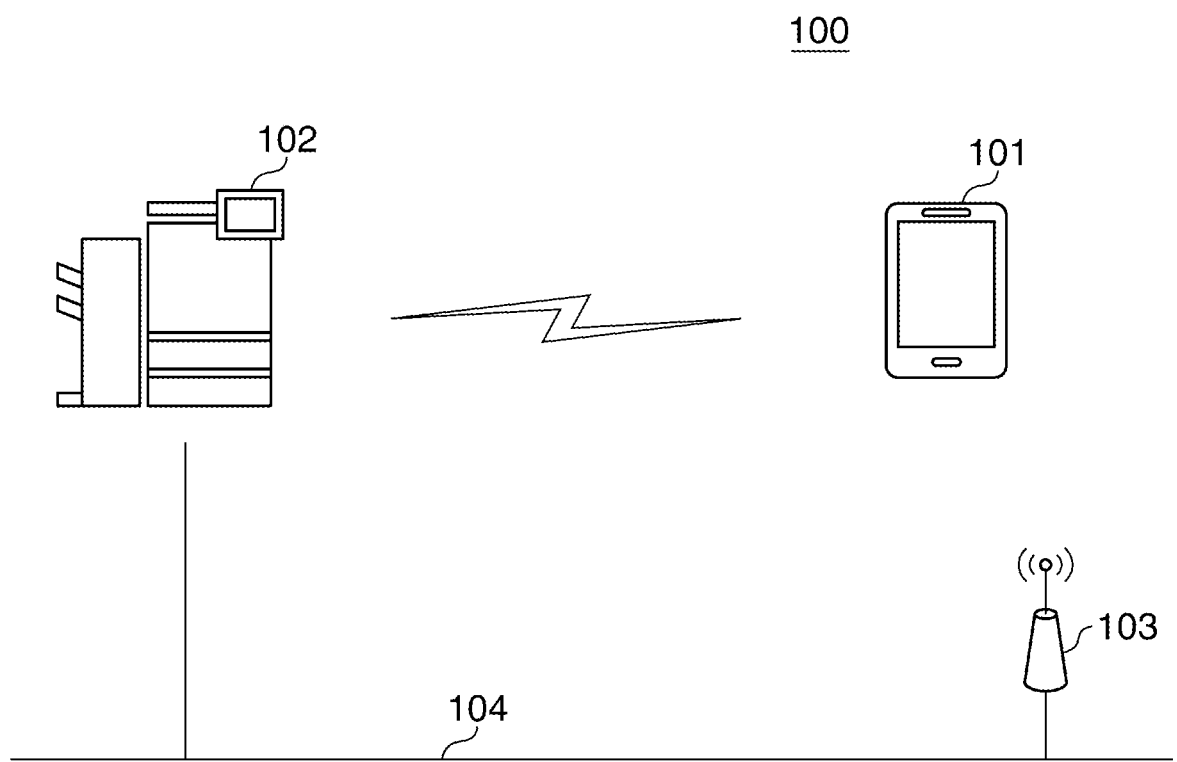
FIG. 1 is a block diagram schematically showing a configuration of a remote operation system including a mobile terminal according to an embodiment of the present invention.

FIG. 1 is a block diagram schematically showing a configuration of a remote operation system 100 including a mobile terminal 101 according to an embodiment of the present invention.

As shown in FIG. 1, the remote operation system 100 is provided with the mobile terminal 101 and an MFP 102 as an image processing apparatus.

In the remote operation system 100, a user is able to remotely operate the MFP 102 using the mobile terminal 101. The mobile terminal 101 is a portable communication device, such as a smart phone or a tablet terminal, and enables a short-range wireless communication. Specifically, the short-range wireless communication includes wireless communication based on a Bluetooth (registered trademark) standard (hereinafter referred to as "Bluetooth communication"), NFC (Near Field Communication), Transfer jet (registered trademark), and ZigBee. Although this embodiment describes an example that uses the Bluetooth communication, other wireless communication may be used instead of the short-range wireless communication like the Bluetooth communication. For example, Wi-Fi-direct communication and Wi-Fi aware communication may be used. When detecting an MFP that is capable of the Bluetooth communication, the mobile terminal 101 sends user information, such as a user ID and a password, for logging in to the detected MFP to the above-mentioned detected MFP. The above-mentioned user information shall be beforehand stored in the mobile terminal 101. Moreover, the mobile terminal 101 performs wireless LAN communication, which has a wider communication area and higher communication speed than the short-range wireless communication, with an external apparatus (not shown) through a wireless router 103 that is connected to a LAN 104. Furthermore, an application module (hereinafter referred to as an "application" simply) for achieving a function that a user desires may be installed in the mobile terminal 101 additionally. The embodiment assumes that a below-mentioned MFP application (a remote control application) 305 shown in FIG. 3 for remotely operating an MFP that is capable of the short-range wireless communication like the MFP 102 from the mobile terminal 101 has been installed in the mobile terminal 101, as an example. The MFP 102 executes a scan process that reads an original arranged on an original platen (not shown). Moreover, the MFP 102 executes a printing process that prints on the basis of obtained print data and a retention printing process that retains obtained pint data without printing immediately and prints the retained print data according to a user's execution instruction. Furthermore, the MFP 102 performs short-range wireless communication and wireless LAN communication with the mobile terminal 101, and performs wired LAN communication with an external apparatus (not shown) that is connected to the LAN 104.

Figure 2:
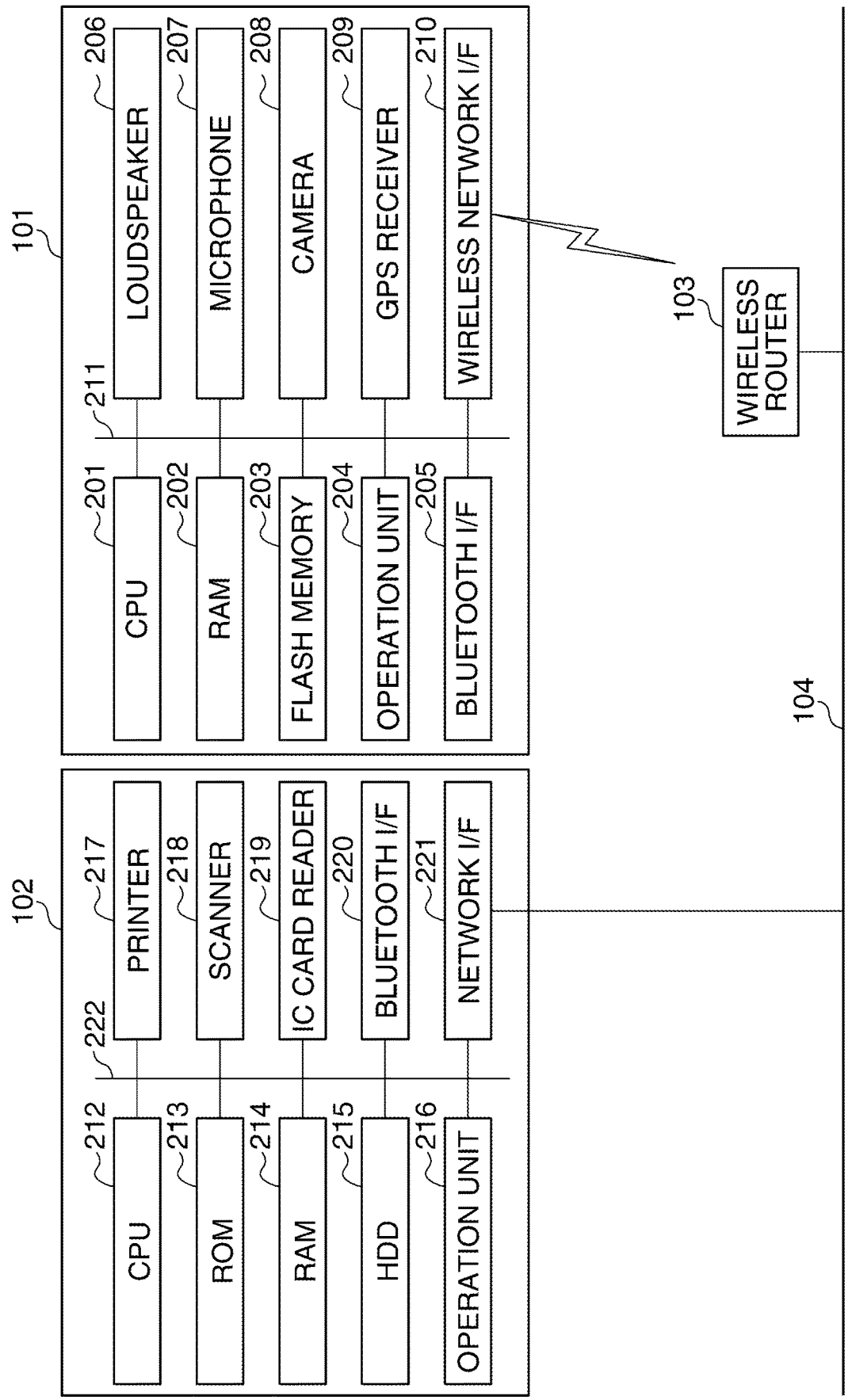
FIG. 2 is a block diagram schematically showing hardware configurations of the mobile terminal and an MFP shown in FIG. 1.

FIG. 2 is a block diagram schematically showing hardware configurations of the mobile terminal 101 and the MFP 102 shown in FIG. 1.

The hardware configuration of the mobile terminal 101 will be described first. As shown in FIG. 2, the mobile terminal 101 is provided with a CPU 201, a RAM 202, a flash memory 203, an operation unit 204, a Bluetooth I/F 205, a loudspeaker 206, and a microphone 207. Moreover, the mobile terminal 101 is provided with a camera 208, a GPS (Global Positioning System) receiver 209, and a wireless network I/F 210. The CPU 201, RAM 202, flash memory 203, operation unit 204, Bluetooth I/F 205, loudspeaker 206, microphone 207, camera 208, GPS receiver 209, and wireless network I/F 210 are mutually connected through a system bus 211.

The CPU 201 controls the below-mentioned software module 300 shown in FIG. 3 by running a program stored in the flash memory 203. The RAM 202 is a volatile memory and is used as a main memory of the CPU 201 and a temporary storage area for various data. The flash memory 203 is a nonvolatile memory and stores a program executed by the CPU 201 and various data. The operation unit 204 is provided with a touch-sensitive display unit (not shown) that is capable of detecting a user's touch operation. The Bluetooth I/F 205 is an interface for the Bluetooth communication and performs the Bluetooth communication with an external apparatus (the MFP 102, for example) that is capable of the Bluetooth communication. The loudspeaker 206 outputs voice on the basis of an obtained voice signal. The microphone 207 converts detected voice into a voice signal. The camera 208 captures a static image and a video image according to a user's instruction. The GPS receiver 209 measures a current position of the mobile terminal 101. The wireless network I/F 210 is an NIC (Network Interface Card) that performs the wireless LAN communication through the wireless router 103.

Next, the hardware configuration of the MFP 102 will be described. As shown in FIG. 2, the MFP 102 is provided with a CPU 212, a ROM 213, a RAM 214, an HDD 215, an operation unit 216, a printer 217, a scanner 218, an IC card reader 219, a Bluetooth I/F 220, and a network I/F 221. The CPU 212, ROM 213, RAM 214, HDD 215, operation unit 216, printer 217, scanner 218, IC card reader 219, Bluetooth I/F 220, and network I/F 221 are mutually connected through a system bus 222.

The CPU 212 totally controls the entire MFP 102. The ROM 212 stores programs that are executed by the CPU 122. The RAM 214 is a volatile memory and is used as a main memory of the CPU 212 and a temporary storage area for various data. The HDD 215 stores programs, image data, etc. The operation unit 216 is provided with a touch-sensitive display unit (not shown) that is capable of detecting a user's touch operation and a plurality of operation keys. The printer 217 prints on a sheet on the basis of obtained print data. The scanner 218 reads an original arranged on an original platen (not shown), and generates image data on the basis of the read information. The IC card reader 219 reads authentication information that is used for user authentication from an IC card (not shown). The Bluetooth I/F 220 is an interface for the Bluetooth communication and performs the Bluetooth communication with an external apparatus (the mobile terminal 101, for example) that is capable of the Bluetooth communication. The Network I/F 221 is an NIC for data communication with an external apparatus (not shown) that is connected to the LAN 104.

Figure 3:
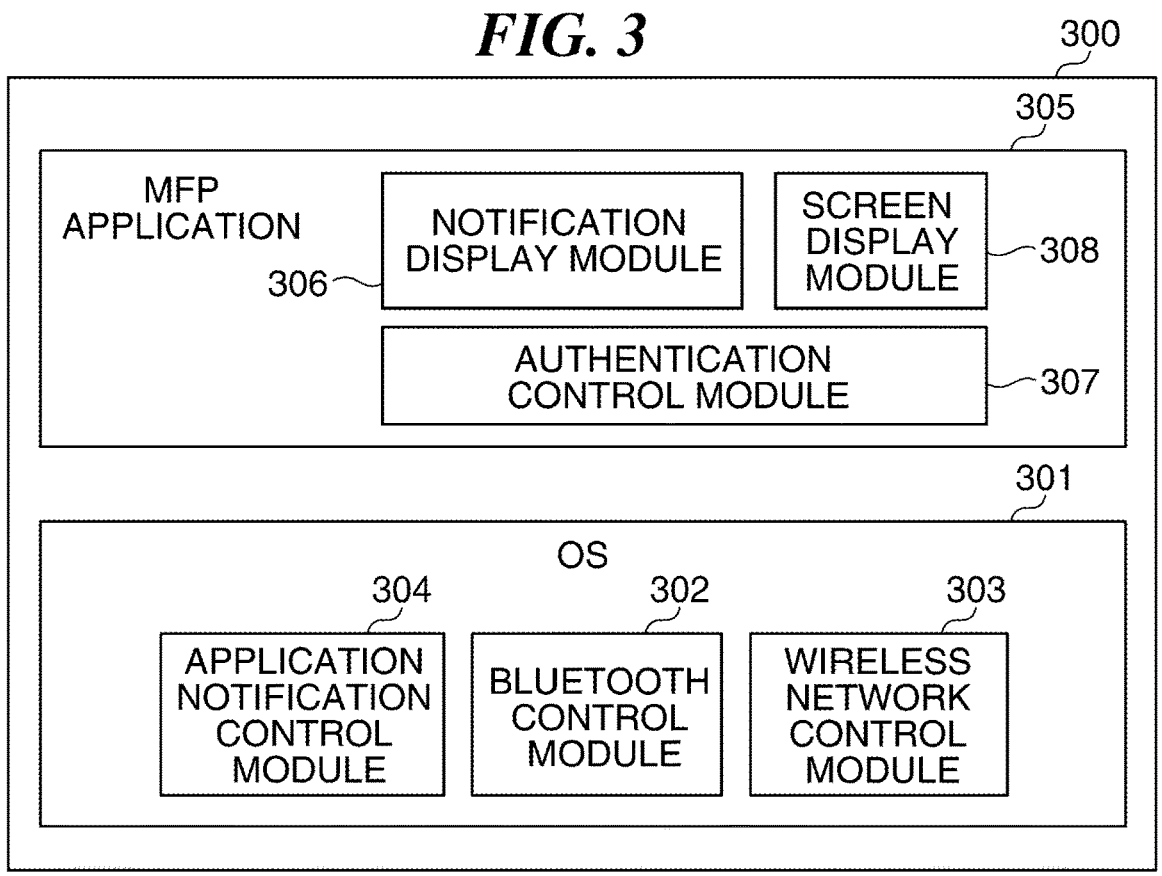
FIG. 3 is a block diagram schematically showing a configuration of a software module of the mobile terminal shown in FIG. 1.

FIG. 3 is a block diagram schematically showing a configuration of a software module 300 of the mobile terminal 101 shown in FIG. 1.

As shown in FIG. 3, the software module 300 is provided with an OS module 301 and an MFP application 305. The OS module 301 is provided with a Bluetooth control module 302, a wireless network control module 303, and an application notification control module 304. The MFP application 305 is provided with a notification display module 306, an authentication control module 307, and a screen display module 308. Each process of the software module 300 is performed when the CPU 201 runs a program stored in the flash memory 203.

The OS module 301 is beforehand installed in the mobile terminal 101, and controls operations of the entire mobile terminal 101. The OS module 301 displays a setting screen for setting up an application like the MFP application 305 on the basis of an instruction received from the application concerned on the operation unit 204. Moreover, the OS module 301 is provided with a device driver group for controlling hardware devices of the mobile terminal 101, and provides APIs for using the hardware devices for an application running on the OS module 301. Specifically, the device driver group includes the Bluetooth control module 302 and the wireless network control module 303 in the embodiment. The Bluetooth control module 302 controls the Bluetooth I/F 205 and the wireless network control module 303 controls the wireless network I/F 210. When satisfying a notification condition registered beforehand, the application notification control module 304 issues an event notification to an application. For example, when receiving radio wave of the Bluetooth communication, the application notification control module 304 issues an event notification to the MFP application 305 in the embodiment.

The MFP application 305 is installed in the mobile terminal 101 by a user, and controls various processes for remote operations to the MFP 102. When receiving the above-mentioned event notification from the application notification control module 304, the MFP application 305 displays a message that checks whether login to the MFP that sent the above-mentioned radio wave is required on the operation unit 204. Hereinafter, display of the above-mentioned message on the operation unit 204 is referred to as "login display". Moreover, the MFP application 305 sends the user information registered beforehand to the MFP that sent the received radio wave of the Bluetooth communication.

Figure 4A:
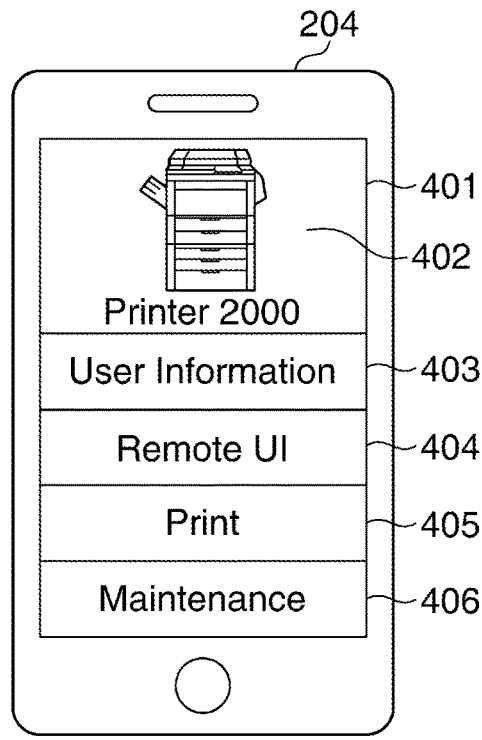
FIG. 4A and FIG. 4B are views showing examples of screens displayed on an operation unit shown in FIG. 2.

The notification display module 306 controls the login display. The authentication control module 307 sends a login request including the user information for logging in to the MFP, which sent the radio wave of the Bluetooth communication received by the mobile terminal 101, to the MFP concerned. The screen display module 308 controls display of a remote top screen 401 shown in FIG. 4A for setting up the MFP application 305.

Figure 4B:
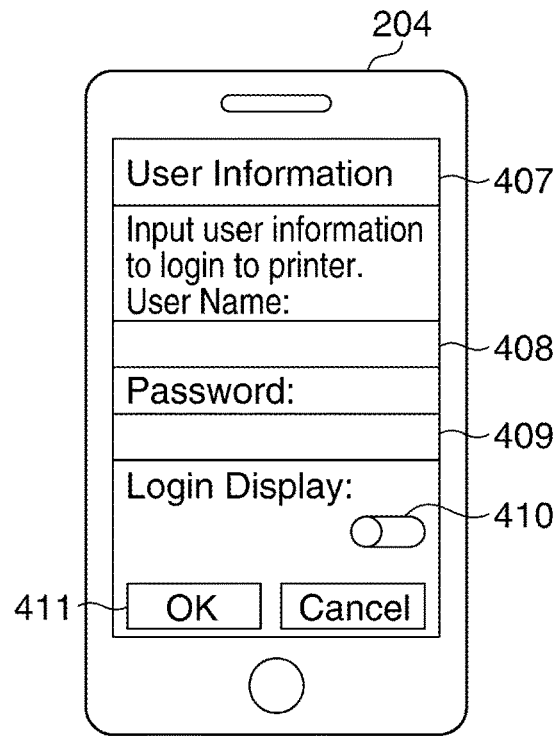

The remote top screen 401 is displayed on the operation unit 204 during an operation of the MFP application 305 as a foreground thread in the mobile terminal 101. The remote top screen 401 is provided with an MFP information display column 402, a user information button 403, a remote UI button 404, a print button 405, and a maintenance button 406. A model name and appearance information about an MFP (hereinafter referred to as a "selected MFP") that is selected by a user are displayed in the MFP information display column 402. The user information button 403 is an operation button for setting up the user information for logging in to the selected MFP. When a user selects the user information button 403, a user information setting screen 407 shown in FIG. 4B for setting up the user information is displayed on the operation unit 204. The user information setting screen 407 is provided with a user name setting column 408, a password setting column 409, a changeover switch 410, and an OK button 411. When a user name and a password are respectively input into the user name setting column 408 and the password setting column 409 in the user information setting screen 407, and when the OK button 411 is selected, the information input into the user name setting column 408 and the password setting column 409 will be registered as the user information. Moreover, the user is able to enable or disable the login display by operating the changeover switch 410 in the user information setting screen 407. Specifically, setting to "ON" of the changeover switch 410 enables the login display, and setting to "OFF" of the changeover switch 410 disables the login display. The setting information set up in the user information setting screen 407 is stored in an authentication information storage area (not shown) allocated to the flash memory 203.

Referring back to FIG. 4A, the remote UI button 404 is an operation button for remotely operating the selected MFP. The user's selection of the remote UI button 404 starts a web browser and displays a remote operation screen (not shown) for remotely operating the selected MFP on the operation unit 204. The print button 405 is an operation button for instructing the selected MFP to print. The maintenance button 406 is an operation button for displaying a maintenance screen for the selected MFP on the operation unit 204.

Figure 5:
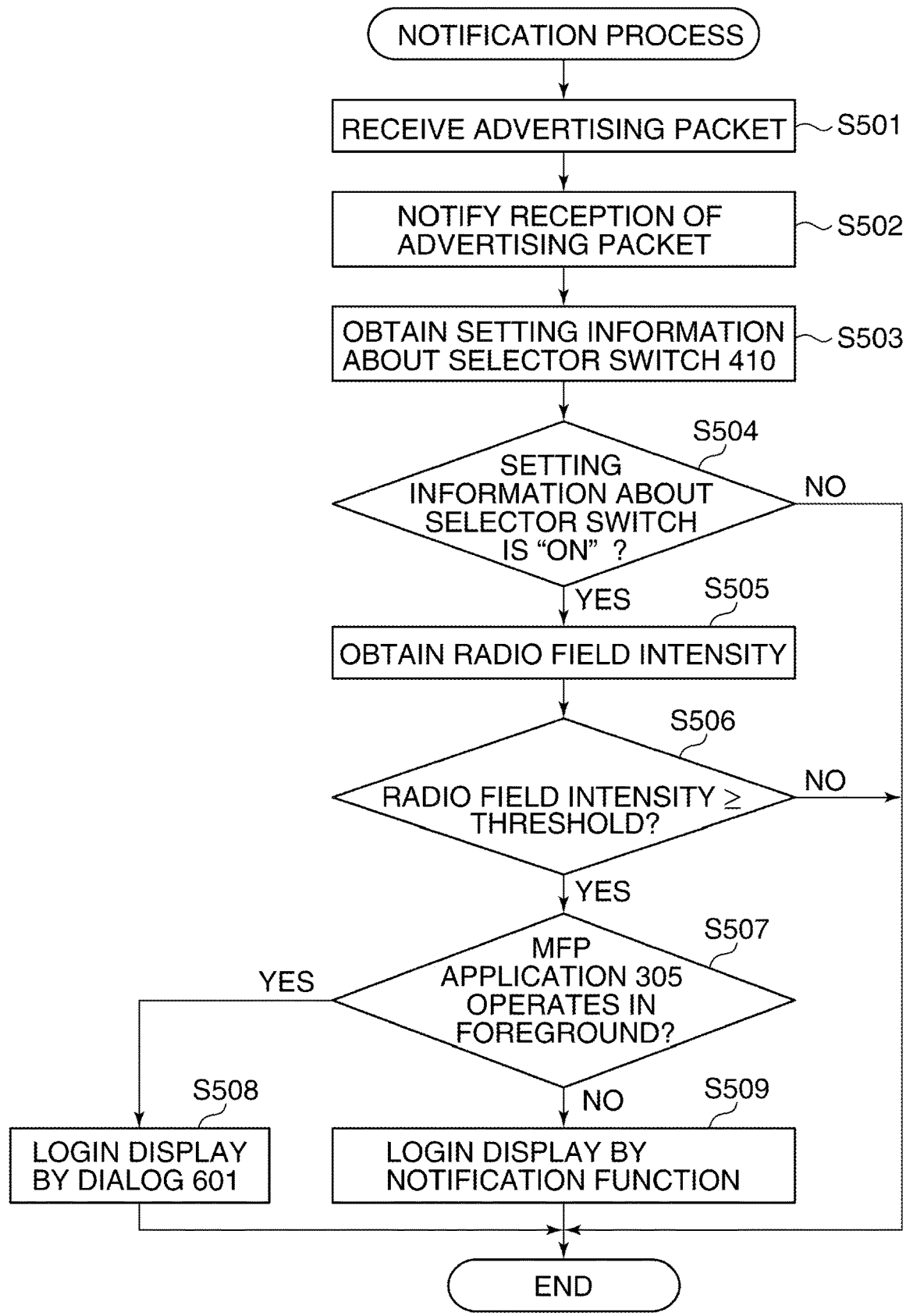
FIG. 5 is a flowchart showing procedures of a notification process executed by the mobile terminal shown in FIG. 1.

FIG. 5 is a flowchart showing procedures of a notification process executed by the mobile terminal 101 shown in FIG. 1.

The process in FIG. 5 is performed when the CPU 201 of the mobile terminal 101 runs the program stored in the flash memory 203 at the time of starting the MFP application 305.

As shown in FIG. 5, the CPU 201 first receives an advertising packet for performing the Bluetooth communication from an external apparatus that is the MFP 102, for example (step S501). Then, the Bluetooth control module 302 notifies the application notification control module 304 of reception of the above-mentioned advertising packet (step S502). The advertising packet includes device information indicating a name and function of the MFP 102 that sent the advertising packet, and radio field intensity indicating output intensity of the advertising packet. Next, the CPU 201 obtains the setting information about the changeover switch 410 in the user information setting screen 407 (step S503). The setting information about the changeover switch 410 is "ON" that enables the login display or "OFF" that disables the login display. The CPU 201 determines whether the obtained setting information about the changeover switch 410 is "ON" (step S504).

As a result of the determination in the step S504, when the setting information about the changeover switch 410 is "OFF", the CPU 201 finishes this process. In the meantime, as a result of the determination in the step S504, when the obtained setting information about the changeover switch 410 is "ON", the CPU 201 obtains the radio field intensity included in the received advertising packet (step S505). Next, the CPU 201 determines whether the obtained radio field intensity is not less than a predetermined threshold that was set beforehand (step S506). For example, the radio field intensity of about −70 dBm is set to the predetermined threshold.

As a result of the determination in the step S506, when the obtained radio field intensity is less than the predetermined threshold, the CPU 201 finishes this process without performing the login display. In the meantime, as a result of the determination in the step S506, when the obtained radio field intensity is not less than the predetermined threshold, the CPU 201 determines whether the MFP application 305 is operating as a foreground thread (step S507). In the embodiment, when the MFP application 305 is operating as the foreground thread, the remote top screen 401 is displayed on the operation unit 204. At this time, the user is able to instruct the MFP 102 to execute various processes via the remote top screen 401. In the meantime, when the MFP application 305 satisfies a predetermined sleep condition that was beforehand set up during operation as the foreground thread, the MFP application 305 is switched from the operation as the foreground thread to an operation as a background thread. Moreover, a lock screen (for example, see FIG. 6B mentioned later) is displayed on the operation unit 204 instead of the remote top screen 401. Since the remote top screen 401 is not displayed on the operation unit 204 at this time, the user cannot instruct the MFP 102 to execute various processes.

Figure 6A:
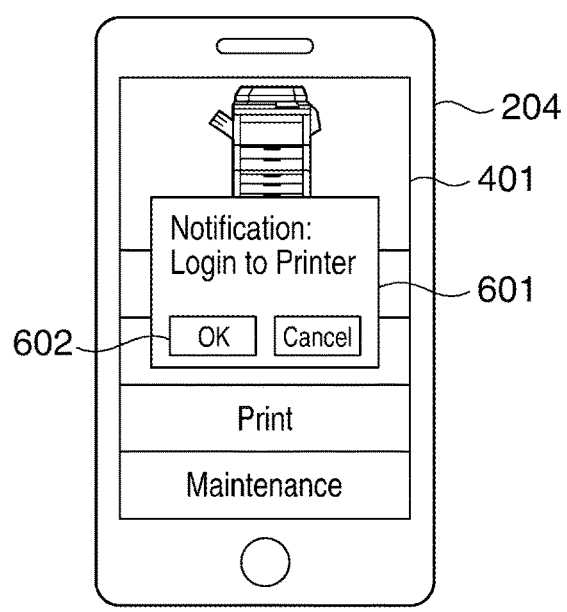
FIG. 6A through FIG. 6E are views showing examples of screens displayed on the operation unit shown in FIG. 2.

As a result of the determination in the step S507, when the MFP application 305 is operating as the foreground thread, the CPU 201 performs the login display by displaying a dialog 601 over the remote top screen 401 as shown in FIG. 6A (step S508). The dialog 601 includes an OK button 602 for instructing the MFP 102 to perform login. After that, the OS module 301 finishes this process.

Figure 6B:
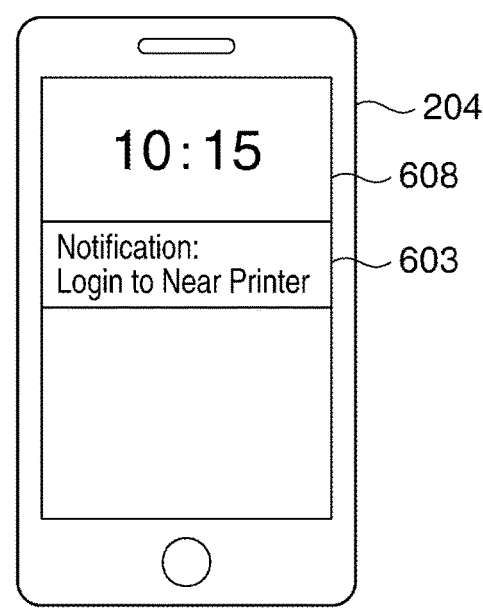
Figure 6C:
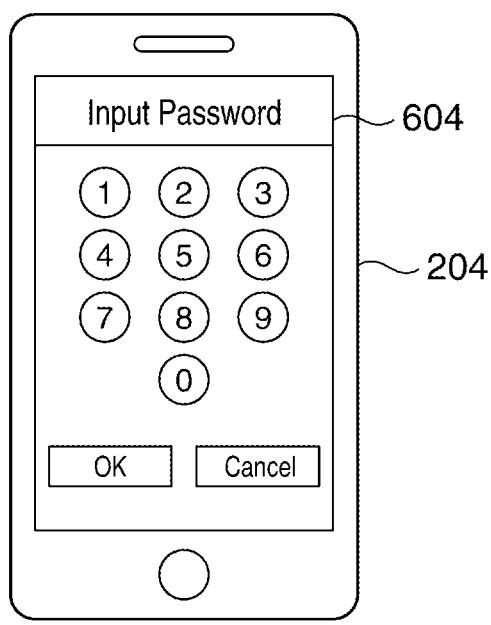

As a result of the determination in the step S507, when the MFP application 305 is not operating as the foreground thread, the CPU 201 performs the login display by a notification function (step S509). The CPU 201 is capable of outputting a message by the notification function while performing the MFP application 305 as the background thread. In the login display by the notification function, as shown in FIG. 6B, a display area 603 including a message that ascertains execution of the login to the MFP 102 is displayed over the lock screen 608, for example. The login display by the notification function does not restrict a user's input operation even if the lock screen 608 is displayed on the operation unit 204. When the user touches the display area 603, an unlocking screen 604 shown in FIG. 6C for unlocking the lock screen 608 is displayed on the operation unit 204. After that, the OS module 301 finishes this process.

The conventional mobile terminal requires that the user performs a predetermined unlocking operation for unlocking the lock screen 608 on the unlocking screen 604 when the user instructs the MFP 102 to execute a process under the condition where the lock screen 608 is displayed, so that time and effort occur.

As compared with this, an execution instruction button for instructing the MFP 102 to execute a process is displayed while displaying the lock screen 608 in the embodiment.

Figure 7:
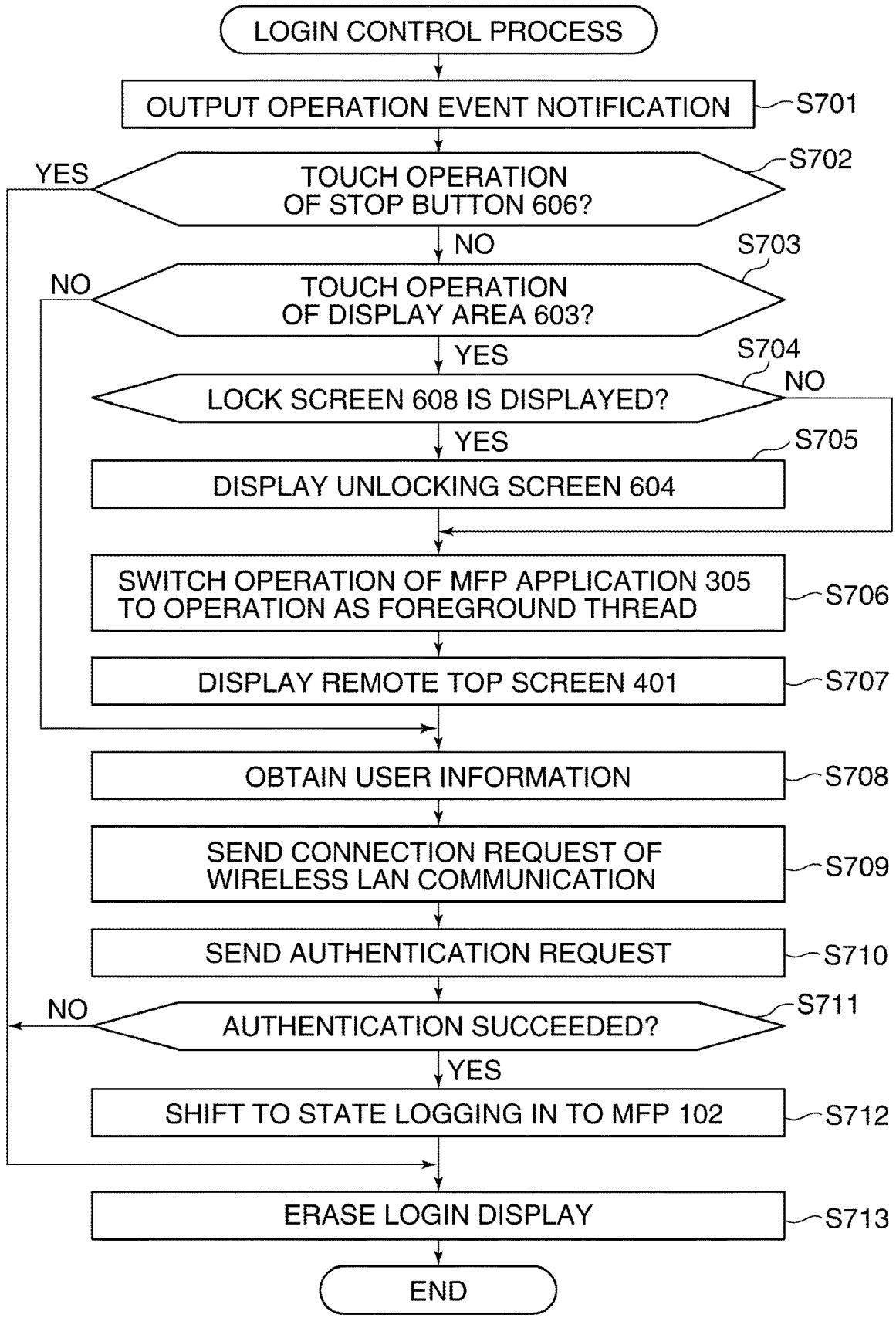
FIG. 7 is a flowchart showing procedures of a login control process executed by the mobile terminal shown in FIG. 1.

FIG. 7 is a flowchart showing procedures of a login control process executed by the mobile terminal 101 shown in FIG. 1.

The process in FIG. 7 is performed when the CPU 201 of the mobile terminal 101 runs the program stored in the flash memory 203. Moreover, the process in FIG. 7 is executed when the MFP application 305 operates as the background thread and when the login display by the notification function in the step S509 is performed.

Figure 6D:
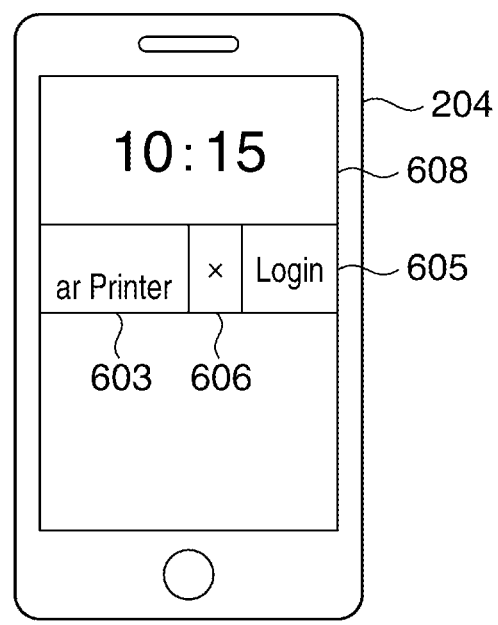
Figure 6E:
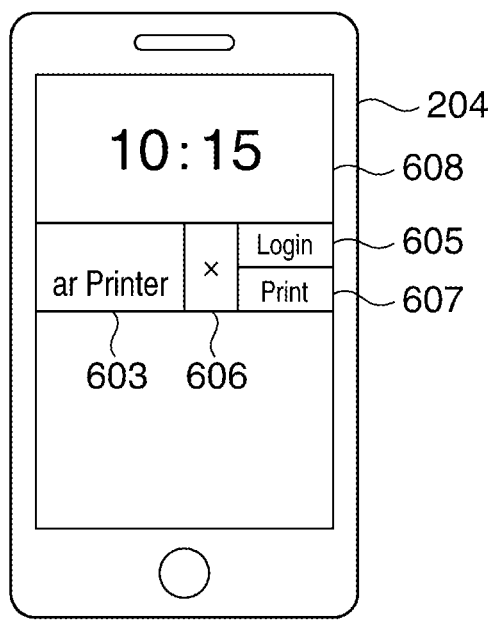

As shown in FIG. 7, when the user operates the operation unit 204, the CPU 201 controls the OS module 301 to output an operation event notification indicating an operation content to the MFP application 305 (step S701). In the embodiment, when the user performs a predetermined operation, such as a left swipe operation, in the display area 603 displayed on the operation unit 204, a login button (an execution instruction button) 605 and an abort button 606 are displayed on the operation unit 204 as shown in FIG. 6D. The login button 605 is an operation button for instructing login to the MFP 102. The abort button 606 is an operation button for instructing elimination of the display area 603. Moreover, a print button 607 may be displayed on the operation unit 204 as shown in FIG. 6E in addition to the login button 605 and the abort button 606 in the embodiment. The print button 607 is an operation button for instructing the MFP 102 to print the retained print data in the MFP 102. In the step S701, the CPU 201 controls the OS module 301 to output the operation event notification indicating a touch operation in the display area 603, a touch operation to the login button 605, or a touch operation to the abort button 606 to the MFP application 305. Next, the CPU 201 determines whether the above-mentioned operation event notification indicates the touch operation to the abort button 606 (step S702).

As a result of the determination in the step S702, when the above-mentioned operation event notification indicates the touch operation to the abort button 606, the CPU 201 proceeds with the process to step S713 mentioned later. In the meantime, as a result of the determination in the step S702, when the above-mentioned operation event notification does not indicate the touch operation to the abort button 606, the CPU 201 determines whether the above-mentioned operation event notification indicates the touch operation in the display area 603 (step S703).

As a result of the determination in the step S703, when the above-mentioned operation event notification indicates the touch operation in the display area 603, the CPU 201 determines whether the lock screen 608 is displayed on the operation unit 204 (step S704).

As a result of the determination in the step S704, when the lock screen 608 is displayed, the CPU 201 displays the unlocking screen 604 on the operation unit 204 (step S705). When accepting the predetermined unlocking operation by the user via the unlocking screen 604, the CPU 201 proceeds with the process to step S706.

In the meantime, as a result of the determination in the step S704, when the lock screen 608 is not displayed, the CPU 201 switches the operation of the MFP application 305 to the operation as the foreground thread (step S706). Next, the CPU 201 displays the remote top screen 401 on the operation unit 204 (step S707), and proceeds with the process to step S708.

As a result of the determination in the step S703, when the obtained operation event notification does not indicate the touch operation in the display area 603 (i.e., when the touch operation to the login button 605 is indicated), the CPU 201 obtains the user information registered beforehand (step S708). Next, the CPU 201 sends a connection request of the wireless LAN communication to the MFP 102 by the Bluetooth communication (step S709), and sends an authentication request including the user information to the MFP 102 (step S710). Next, when obtaining a response notification indicating success or failure of the authentication request from the MFP 102, the CPU 201 determines whether the obtained response notification indicates success of the authentication (step S711).

As a result of the determination in the step S711, when the obtained response notification indicates the success of the authentication, the CPU 201 shifts the MFP application 305 to a state logging in to the MFP 102 (step S712). This allows the user to remotely operate the MFP 101 from the mobile terminal 101. Next, the CPU 201 erases the login display (step S713), and finishes this process.

As a result of the determination in the step S711, when the obtained response notification indicates the failure of the authentication, the CPU 201 proceeds with the process to the step S713 without shifting to the state logging in to the MFP 102.

According to the above-mentioned embodiment, the execution instruction button for instructing the MFP 102 to execute a process is displayed on the operation unit 204 while displaying the lock screen 608. That is, when instructing the MFP 102 to execute a process, the user is not required to unlock the lock screen 608. This allows to omit the predetermined unlocking operation for unlocking the lock screen 608 and to reduce the time and effort of the user at the time of instructing the MFP 102 to execute a process.

Moreover, the execution instruction button is the login button 605 for giving a login instruction for logging in to the MFP 102 from the mobile terminal 101 in the above-mentioned embodiment. This reduces the time and effort of the user at the time of logging in to the MFP 102 from the mobile terminal 101.

Furthermore, the execution instruction button is the print button 607 for instructing the MFP 102 to print the retained print data in the MFP 102 in the above-mentioned embodiment. This reduces the time and effort of the user at the time of printing the retained print data in the MFP 102.

The execution instruction button is displayed by the notification function that does not restrict user's input operations in the above-mentioned embodiment. This allows the mobile terminal 101 to accept the execution instruction corresponding to the operation of the execution instruction button by the user, even if the lock screen 608 is displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-101801, filed May 23, 2017, which is hereby incorporated by reference herein in its entirety.

What is claimed is:

1. A mobile terminal comprising:
a memory device that stores a set of instructions; and
at least one processor that executes the set of instructions to:
detect an advertising packet for Bluetooth Low Energy, which is transmitted by an external device;
determine whether or not to perform a notification, based on a radio field intensity of the detected advertising packet for Bluetooth Low Energy;
display, on a display unit, a lock screen that restricts user's operations on the mobile terminal;
display a notification object by overlaying on the displayed lock screen, in a case where the processor determines to perform the notification while the lock screen is displayed on the display unit; and
request the external device to execute a predetermined process, without unlocking the lock screen on the display unit in a case where a first instruction is performed on the notification object displayed by overlaying on the displayed lock screen by the user via the display unit.

2. The mobile terminal according to claim 1, wherein the first instruction is a login instruction for logging in to the external device from the mobile terminal, and wherein the predetermined process is a log-in process for the user of the mobile terminal.

3. The mobile terminal according to claim 1, wherein the external device is printing apparatus, and the first instruction is a print instruction for printing print data which is stored in the printing apparatus, and wherein the predetermined process is a process for printing the stored print data.

4. The mobile terminal according to claim 1, wherein the first instruction is instructed by the user via a button corresponding to the first instruction, the button being displayed in response to a swipe operation for the displayed notification object on the lock screen.

5. The mobile terminal according to claim 4, wherein the at least one processor further executes the set of instructions to display, on the display unit, a screen of a control application for requesting the external device to execute the predetermined process, in response to a second instruction different from the first instruction is instructed by operation for the a user via the displayed notification object and then the lock screen is unlocked based on authentication information obtained from the user.

6. The mobile terminal according to claim 1, wherein the at least one processor further executes the set of instructions to set, based on a user's operation, whether or not perform the notification as an operation setting of the mobile terminal, and
wherein in a case where it is set not to perform the notification as the operation setting, the notification object is not displayed regardless a state of the detection of the advertising packet for Bluetooth Low Energy transmitted by the external device.

7. A control method for a mobile terminal, the control method comprising:
detecting an advertising packet for Bluetooth Low Energy, which is transmitted by an external device;
determining whether or not to perform a notification, based on a radio field intensity of the detected advertising packet for Bluetooth Low Energy;
displaying, on a display unit, a lock screen that restricts user's operations on the mobile terminal;
displaying a notification object by overlaying on the displayed lock screen, in a case where the mobile terminal determines to perform the notification while the lock screen is displayed on the display unit; and
requesting the external device to execute a predetermined process, without unlocking the lock screen on the display unit in a case where a first instruction is performed on the notification object displayed by overlaying on the displayed lock screen by the user via the displayed notification display unit.

8. A non-transitory computer-readable storage medium storing a control program causing a computer of a mobile terminal to execute:
detecting an advertising packet for Bluetooth Low Energy, which is transmitted by an external device;
determining whether or not to perform a notification, based on a radio field intensity of the detected advertising packet for Bluetooth Low Energy;
displaying, on a display unit, a lock screen that restricts user's operations on the mobile terminal;

displaying a notification object by overlaying on the displayed lock screen, in a case where the mobile terminal determines to perform the notification while the lock screen is displayed on the display unit; and requesting the external device to execute a predetermined process, without unlocking the lock screen on the display unit in a case where a first instruction is performed on the notification object displayed by overlaying on the displayed lock screen by the user via the display unit.

\* \* \* \* \*